United States Patent [19]

Tyler

[11] Patent Number: 4,462,550

[45] Date of Patent: Jul. 31, 1984

[54] APPARATUS FOR DISTRIBUTING A SUBSTANCE

[75] Inventor: Loren E. Tyler, Benson, Minn.

[73] Assignee: Lor-Al Corporation, Benson, Minn.

[21] Appl. No.: 375,384

[22] Filed: May 6, 1982

[51] Int. Cl.³ ............................................ A01C 15/04
[52] U.S. Cl. ..................................... 239/655; 406/52
[58] Field of Search ....................... 239/654, 655, 664; 406/52, 53, 56, 71, 181; 222/240, 241, 242

[56] References Cited

U.S. PATENT DOCUMENTS

| | | | |
|---|---|---|---|
| 2,559,557 | 7/1951 | Bailey et al. | 406/53 |
| 2,601,534 | 6/1952 | Laffoon | 222/242 |
| 2,923,574 | 2/1960 | Fuss et al. | |
| 2,945,698 | 7/1960 | Kaller | 239/655 |
| 3,169,799 | 2/1965 | Puckett et al. | |
| 3,631,825 | 1/1972 | Weiste | |
| 3,643,872 | 2/1972 | Smith | |
| 3,675,856 | 7/1972 | Kverneland | |
| 3,926,377 | 12/1975 | Johnson | |
| 4,020,991 | 5/1977 | Dreyer | |
| 4,024,822 | 5/1977 | Ross et al. | |

FOREIGN PATENT DOCUMENTS

| | | |
|---|---|---|
| 284449 | 8/1913 | Fed. Rep. of Germany |
| 1569181 | 3/1969 | France |
| 1564295 | 4/1969 | France |

OTHER PUBLICATIONS

U.S. Ser. No. 288,675 filed Jul. 31, 1981, by Charles Balmer entitled "Pneumatic Granular or Seed Applicator".

Primary Examiner—John J. Love
Assistant Examiner—James Moon
Attorney, Agent, or Firm—Merchant, Gould, Smith, Edell, Welter & Schmidt

[57] ABSTRACT

An apparatus (10) for distributing a substance (18) from a container (16) among a plurality of delivery channels (22) is disclosed. Apparatus (10) includes an auger (20) for moving a stream of substance (18) upwardly for outward centrifugal deflection by paddles (44) into a plurality of distributor pockets (60). Substance (18) which impacts and is retained in distributor pocket areas falls gravitationally into delivery tubes (22) for subsequent movement by pressurized air to outputs (26).

4 Claims, 3 Drawing Figures

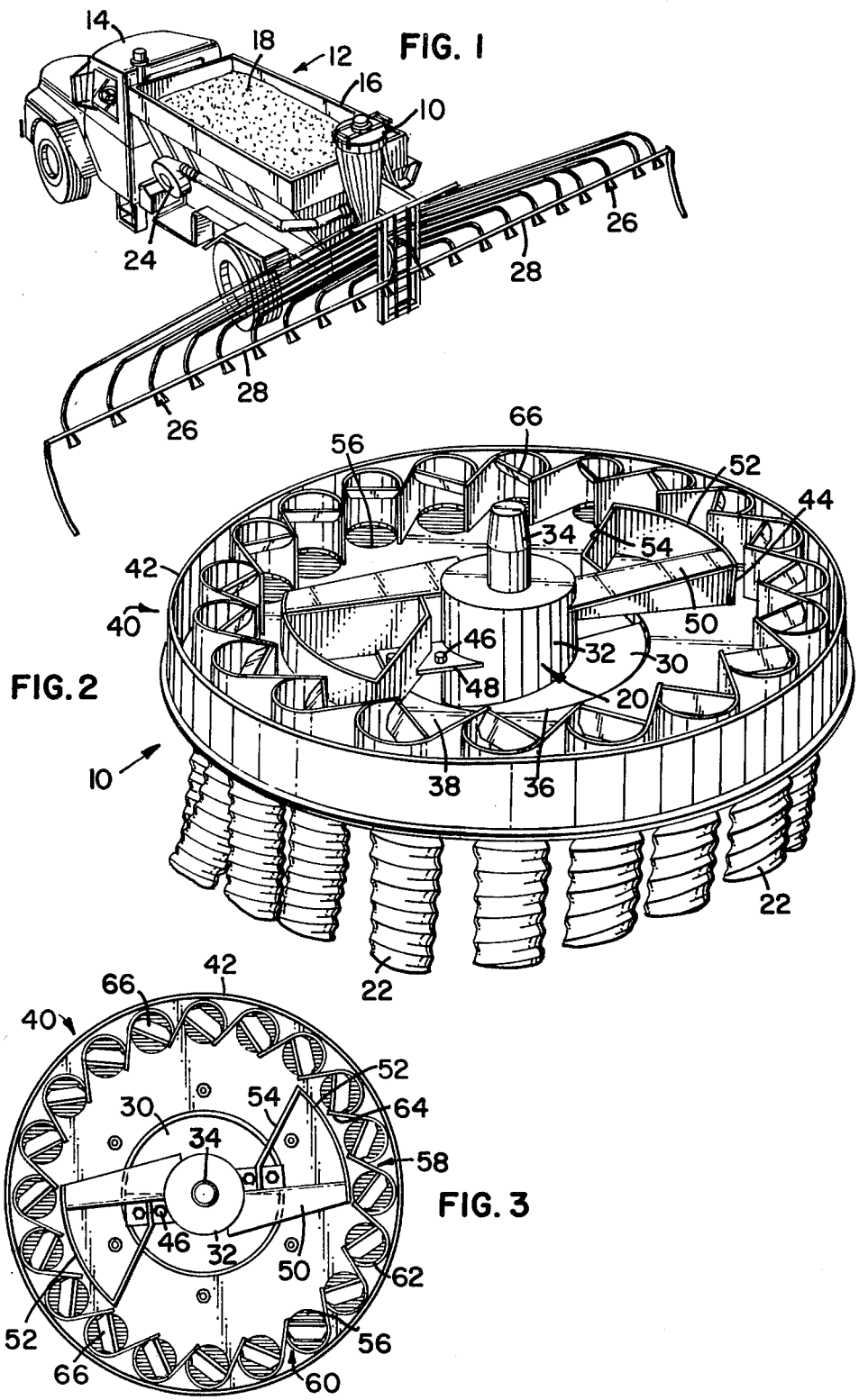

4,462,550

APPARATUS FOR DISTRIBUTING A SUBSTANCE

TECHNICAL FIELD

This invention relates to an apparatus for distributing a substance from a container among a plurality of delivery channels. The apparatus most commonly relates to an agricultural implement for spreading seeds, fertilizer, chemicals or other powdered or granulated material onto a field.

BACKGROUND OF THE INVENTION

Chemicals, fertilizers and other powdered or granulated substances are commonly applied to agricultural crops. Applicator implements for applying such substances commonly include a vehicle, usually self propelled, with a box and some type of distributing apparatus downstream from a box outlet. A spinner mechanism has been used for many years to simply throw the substance centrifugally outwardly from a location beneath the box outlet.

More recently, applicator implements for dry substances have used distributing apparatus which incorporates a pneumatic source for forcing the substance through a plurality of delivery channels spaced along the rear of the implement or along a boom supported by the implement. For example, U.S. Pat. No. 3,606,097 shows a pneumatic distributing apparatus which moves substance through a plurality of channels and out a fan like distribution duct network, and U.S. Pat. No. 3,926,377 shows a centrifugal distributor unit for separating substance into a plurality of distribution tubes for output along arms extended from a vehicle.

More recently still, an applicator implement has appeared which uses a centrifugal distributor which receives substance from a vertical auger and moves it centrifugally outwardly with a blade. The substance falls into depressions which empty into delivery tubes wherein subsequently introduced air forces the substance to outputs spaced along a boom. Known distributing devices, however, exhibit deficiencies in operation which provide less than desirable performance characteristics. The latter described device, for example, is not sufficiently positive in its placement of substance among the various delivery tube openings and can result in uneven distribution of the substance among the output tubes.

SUMMARY OF THE INVENTION

The present invention is directed to an apparatus for distributing a substance from a container to a plurality of delivery channels. The apparatus includes mechanism for elevating from a lower end to an upper end a continuous stream of the substance obtained from the container, mechanism for directing the stream outwardly away from the upper end of the elevating mechanism, and means for receiving the stream and allowing portions of it to gravitationally fall into each of the delivery channels. The receiving mechanism includes a wall rising above each of the delivery channels. The wall stops outward movement of the substance thereby allowing it to fall into the delivery channels.

In one embodiment of the present invention, an auger having a pair of flights moves substance upwardly through a bottom plate of a cylindrical housing. The plate has a plurality of spaced apart outer openings located on a circle centered on the axis of the auger. Delivery tubes are connected beneath each of the outer openings. Semi-cylindrical walls forming distributor pockets rise above a portion of the perimeter of each outer opening. A pair of paddles extending outwardly from the central core of the auger rotate with the auger. The paddles move substance outwardly along the bottom plate of the housing and pass in close proximity to the various walls forming distributor pockets. The present apparatus thus advantageously provides a series of closely cooperating guiding surfaces comprising the flights, the paddles and the walls forming the distributor pockets for positively moving substance into each delivery tube of the implement.

Further features provide additional advantages. For example, a sweep member extending rearwardly of each paddle retains within a particular distributor pocket any substance rebounding from the wall of a distributor pocket. A deflecting hood extending from each paddle retains outwardly moving substance between the hood and the bottom plate of the housing thereby positively maintaining the stream of substance. A deflecting member above each outer opening directs the substance downwardly through the opening thereby minimizing rebounding. The combination, then, of the paddles with hoods, the sweep members, and the distributor pockets with walls and overhead deflectors efficiently guide substance and allow distribution from the dual streams produced by the two flights of the auger into a plurality of streams for delivery from the various pockets.

These various advantages and other objects obtained by the use of the present invention are further explained and may be better understood by reference to the drawings which form a further part of this disclosure and to the accompanying descriptive matter in which there is described in more detail a preferred embodiment of the invention.

A BRIEF DESCRIPTION OF THE DRAWINGS

FIG. 1 is a perspective view of an applicator implement typical of the type on which the present invention may be used;

FIG. 2 is a perspective view of apparatus in accordance with the present invention; and FIG. 3 is a top plan view of the apparatus shown in FIG. 2.

DETAILED DESCRIPTION OF THE INVENTION

Referring now to the drawings wherein like reference numerals designate identical or corresponding parts throughout the several views, and more particularly to FIG. 2, a distributing apparatus in accordance with the present invention is designated generally as 10. An applicator implement 12 typical of the type on which apparatus 10 may be used is shown in FIG. 1. Implement 12 includes a vehicle 14 with a box 16 for containing a quantity of the substance 18 to be spread onto a field. Substance 18 passes from box 16 to a vertical auger 20 (see FIG. 2) for movement to distributing apparatus 10. As described hereinafter, substance 18 is distributed to a plurality of delivery tubes 22 wherein it is forced by air blown from fans 24 along delivery tubes 22 to outputs 26 supported along a boom 28.

Apparatus 10 is comprised of a mechanism for elevating a continuous stream of substance 18 obtained from box 16. In the embodiment of FIG. 2, the elevating mechanisim is auger 20 having a pair of flights 30 attached about core 32 mounted on shaft 34. Auger 20 extends upwardly through a central opening 36 in bottom plate 38 of a housing assembly 40 having an outer cylindrical wall 42 rising above bottom plate 38.

Apparatus 10 further includes a mechanism for directing the stream of substance 18 outwardly away from auger 20. Such mechanism includes a pair of oppositely directed paddles 44 fastened such as with nut and bolt combinations 46 to brackets 48 attached to core 32. Preferably, paddles 44 extend outwardly along a radial line from the axis of shaft 34 such that paddles 44 only slightly clear bottom plate 38. A deflecting hood 50 extends outwardly from the upper edge of each paddle 44 to provide a channel between bottom plate 38 and deflecting hood 50 for positive directivity of the particular stream of substance 18. A sweep member 52 extends rearwardly from the outer vertical edge of each paddle 44. Sweep members 52 have a semi-cylindrical shape concentric with cylindrical wall 42. The second end of each sweep member 52 is attached to a brace 54 which extends inwardly for attachment with bracket 48, the inner end of paddle 44, or core 32.

Apparatus 10 includes mechanism for receiving a stream of substance 18 and allowing portions of it to gravitationally fall into delivery tubes 22. In the embodiment of FIGS. 2 and 3, bottom plate 38 has a plurality of openings 56 spaced apart near the outer edge of bottom plate 38. Openings 56 are centered on a circle which is centered on the axis of auger 20. Openings 56 are approximately the same size as the internal diameter of delivery tubes 22. A plurality of walls 58 rise upwardly from a portion of the perimeter of openings 56 to form pocket distributors 60. Each wall 58 has a semi-cylindrical portion 62 and a straight portion 64. Semi-cylindrical portions 62 and openings 56 have approximately the same radii. The walls 58 are arranged on bottom plate 38 such that the ending edge of semi-cylindrical portion 62 is in contact with the straight portion 64 of the next consecutive wall 58. The straight portions 64 extend outwardly along a non-radial line so that paddles 44 pass in close proximity to the ending edges of straight portions 64. A deflecting member 66 extends between consecutive straight portions 64 at a location almost directly over each opening 56. Deflecting members 66 are inclined such that when a stream of substance 18 moves into a particular distributor pocket 60, a portion of the stream impacts deflecting plate 66 causing it to change direction and move downwardly through opening 56 into delivery tube 22.

To operate, as implement 12 begins moving across a field, fans 24 and the drive mechanism (not shown) for auger 20 are energized. Substance 18 from box 16 is elevated by flights 30 of auger 20. At the streams of substance 18 reach the upper end of auger 20 they contact paddles 44 and are moved centrifugally outwardly between bottom plate 38 and deflecting hoods 50. As the paddles 44 rotate, substance 18 is directed into consecutive distributor pockets 60 where substance 18 impacts walls 58 and deflecting members 66. The gravitational force causes substance 18 to then fall downwardly into tubes 22 allowing pressurized air from fans 24 to provide continued movement of substance 18 to outputs 26. Sweep members 52 prevent rebounding substance 18 from leaving distributor pocket areas thereby insuring that substantially equal amounts of substance 18 remain in each distributor pocket 60 as auger 20 and paddles 44 move the streams of substance 18 rotationally along bottom plate 38. Distribution of substance 18 is stopped when fans 24 and the drive mechanism for auger 20 are deenergized.

Although this present disclosure has been described with respect to an agricultural implement such as shown in FIG. 1, it is to be understood that apparatus 10 may be used on various other types of machines which require distribution of material from a container into a plurality of guiding channels. It is understood, therefore, that even though other numerous characteristics and advantages of the present invention, together with details of structure and function, have been described in detail with respect to an agricultural implement, the present disclosure is illustrative only. Consequently, any changes made, especially in matters of shape, size and arrangement, to the full extent extended by the general meaning of the terms on which the appending claims are expressed, are within the principle of the invention.

What is claimed is:

1. On an implement for spreading a substance on the ground, said implement including a container with delivery tubes having outputs supported along a boom, apparatus for distributing said substance from said container among said delivery tubes, said apparatus comprising:

an auger within a tube, said auger having a pair of flights attached to a central core, said auger for receiving substance from said container in order to elevate said substance to an upper end;

means for rotating said auger;

a cylindrical housing having a bottom plate with a plurality of spaced apart outer openings approximately equidistant from the outer edge thereof, one of said delivery tubes being connected beneath one of each of said outer openings;

a plurality of pocket distributors formed with a wall about a portion of each of said outer openings;

a pair of paddles attached to and extending outwardly from the central core of said auger near said upper end, said paddles rotating with said auger to pass in close proximity to at least one end of each pocket distributor, said paddles cooperating with the flights of said auger to move said substance centrifugally outwardly along said bottom plate into said pocket distributors; and a sweep member extending rearwardly from each paddle, said sweep member having a side passing in close proximity to said pocket distributors thereby retaining near said pocket distributors said substance rebounding from said distributors.

2. An apparatus for distributing a substance from a container to a plurality of channels, said apparatus comprising:

means for elevating from a lower end to an upper end a continuous stream of said substance obtained from said container, said elevating means including an auger for rotation within a surrounding tube;

means for directing said stream outwardly away from the upper end of said elevating means, said directing means including a paddle attached to and extending outwardly from said auger, said paddle rotating with said auger, said directing means further including a sweep member extending rearwardly from said paddle to retain near said receiving means substance rebounding from said receiving means wall; and means for receiving said stream and allowing portions of it to gravitationally fall into each of said delivery tubes, said receiving means including a wall rising above each of said delivery tubes, said wall for stopping outward movement of said substance thereby allowing said substance to fall into said delivery tubes.

3. An apparatus for distributing a substance from a container to a plurality of channels, said apparatus comprising:

means for elevating from a lower end to an upper end a continuous stream of said substance obtained from said container, said elevating means including an auger for rotation about an axis, said auger having a central core;

means for directing said stream outwardly away from the upper end of said elevating means, said directing means including a paddle attached to an extending outwardly from the central core of said auger, said paddle being in close proximity to said bottom plate of said housing thereby directing said substance outwardly under centrifugal force as said auger and said paddle rotate; and means for receiving said stream and allowing portions of it to gravitationally fall into each of said delivery tubes, said receiving means including a wall rising above each of said delivery tubes, said wall for stopping outward movement of said substance thereby allowing said substance to fall into said delivery tubes, said receiving means including a housing having a bottom plate, said plate having a plurality of spaced apart outer openings centered on a circle, said circle being centered on said axis, one of said delivery tubes being attached beneath each of said outer openings, said auger moving a steady stream of said substance through a central opening in said plate for subsequent guidance across said plate by said directing means to said outer openings, said walls of said receiving means each including a partially semi-cylindrical portion having a first ending edge and a partially straight portion having a second ending edge, said semi-cylindrical portions and said outer openings in said bottom plate of said housing having radii approximately the same, said rotating paddle passing in close proximity to said second ending edges, said rotating paddle passing at a spaced distance from said first ending edges, each said first ending edge being in contact with the straight portion of an adjacent said wall, whereby as said paddle rotates past a consecutive pair of said straight portions, said substance moves under centrifugal force into the semi-cylindrical portion of said wall thereby allowing gravitational force to move said substance downwardly through the appropriate outer opening into the appropriate delivery tube.

4. An apparatus in accordance with claim 3 wherein said receiving means further includes deflecting members, each said deflecting member being attached between consecutive said straight portions of adjacent said walls, one of said deflecting members being located above each said outer opening in said bottom plate to aid in directing said substance through said outer openings into said delivery tubes.

* * * * *